United States Patent
Alexander et al.

(10) Patent No.: US 10,865,084 B2
(45) Date of Patent: Dec. 15, 2020

(54) CONFIGURABLE ITEM DISPLAY DOLLY

(71) Applicant: Walmart Apollo, LLC, Bentonville, AR (US)

(72) Inventors: Matthew D. Alexander, Rogers, AR (US); Joel Alan Rutledge, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 123 days.

(21) Appl. No.: 16/370,976

(22) Filed: Mar. 30, 2019

(65) Prior Publication Data

US 2019/0308863 A1 Oct. 10, 2019

Related U.S. Application Data

(60) Provisional application No. 62/653,428, filed on Apr. 5, 2018.

(51) Int. Cl.
| | |
|---|---|
| *B66F 9/24* | (2006.01) |
| *B62B 3/02* | (2006.01) |
| *B66F 9/12* | (2006.01) |
| *B66F 9/06* | (2006.01) |

(52) U.S. Cl.
CPC .............. *B66F 9/24* (2013.01); *B62B 3/02* (2013.01); *B66F 9/063* (2013.01); *B66F 9/12* (2013.01); *B62B 2205/30* (2013.01)

(58) Field of Classification Search
CPC combination set(s) only.
See application file for complete search history.

(56) References Cited

U.S. PATENT DOCUMENTS

| | | | |
|---|---|---|---|
| 3,186,185 A | 6/1965 | Bently et al. | |
| 5,505,319 A * | 4/1996 | Todd, Jr. ................ | A47F 5/04 211/163 |
| 5,595,312 A * | 1/1997 | Dardashti ............ | A47B 57/34 211/188 |

(Continued)

FOREIGN PATENT DOCUMENTS

EP    1836928 A2    9/2007

OTHER PUBLICATIONS

Thomas, Shane, "International Search Report", International Application No. PCT/US2019/025070, dated Jun. 17, 2019, 2 pages.

(Continued)

*Primary Examiner* — Kyle O Logan

(57) ABSTRACT

Examples provide a configurable item display dolly. The item display dolly includes a plurality of attachment slots for attaching support arms that hold trays and/or items. In a closed configuration, the support arms are configured to hold the trays a minimum distance apart. In an open configuration, two or more of the support arms are separated a maximum distance apart to enable users to access items on the item display dolly. The item display dolly transports trays of items from a storage area in a transport mode and converts to an item display device in a display mode. A controller component analyzes sensor data, including weight data and temperature data, to update item display dolly inventory, identify broken/damaged items, alert users when trays are empty and/or trigger maintenance or other action if temperature levels fall outside acceptable cold-chain compliance temperature ranges.

20 Claims, 11 Drawing Sheets

(56) References Cited

U.S. PATENT DOCUMENTS

| | | | |
|---|---|---|---|
| 6,390,213 B1 | 5/2002 | Bleicher | |
| 7,188,847 B1 | 3/2007 | Friedman | |
| 7,357,000 B2 | 4/2008 | Schwichtenberg et al. | |
| 7,402,018 B2 | 7/2008 | Mountz et al. | |
| 7,973,642 B2 | 7/2011 | Schackmuth et al. | |
| 8,468,844 B2 | 6/2013 | Nagel et al. | |
| 8,807,354 B2 | 8/2014 | Kitt et al. | |
| 10,024,662 B2* | 7/2018 | Bryan | B25J 9/1679 |
| 2004/0073359 A1 | 4/2004 | Ichijo et al. | |
| 2004/0182804 A1 | 9/2004 | Harper | |
| 2010/0320109 A1* | 12/2010 | Trumbauer | B65D 19/44 |
| | | | 206/386 |
| 2013/0062293 A1* | 3/2013 | Beaty | A47B 47/042 |
| | | | 211/59.2 |
| 2014/0001722 A1 | 1/2014 | Willney | |
| 2014/0299560 A1* | 10/2014 | Kim | A47F 1/126 |
| | | | 211/59.2 |
| 2017/0137171 A1* | 5/2017 | Soehnlen | B65D 85/80 |
| 2017/0224135 A1* | 8/2017 | Burns | F21V 23/06 |
| 2017/0293294 A1 | 10/2017 | Atchley et al. | |

OTHER PUBLICATIONS

Thomas, Shane, "Written Opinion", International Application No. PCT/US2019/025070, dated Jun. 17, 2019, 7 pages.

* cited by examiner

CONFIGURABLE ITEM DISPLAY DOLLY

BACKGROUND

When items, such as jugs of milk, are shipped from a supplier or distribution center, they are typically packaged in multiple layers on a pallet. The pallet is wrapped and shipped to the store or other recipient. Upon arrival at the destination, store personnel typically break open the pallet and manually remove each tray or layer of items from the pallet. These items are taken to a temperature-controlled storage area until needed. When an item display case requires restocking, the items are manually moved from the storage area to the display area and then each individual item is placed into the refrigerated display case. A manual push dolly or pallet fork can be used to assist with moving these pallets and/or trays of items. Even with these available tools, these tasks frequently require two or more people due to the weight and size of the pallet trays, as well as the individual items. Thus, the task of restocking displays, such as refrigerated dairy cases, using available tools is frequently an onerous, tedious, time-consuming and labor-intensive task.

SUMMARY

Some examples provide a self-propelled item display dolly. A base member of the item display dolly includes a propulsion mechanism, a set of wheels coupled to the propulsion mechanism, at least one battery associated with the propulsion mechanism, and a navigation component. A back member connected to a portion of the base member includes attachment slots arranged in pairs. Each pair of attachment slots includes a first slot located a predetermined distance from a second slot. Support arms are removably attached to the back member via the attachment slots. Each pair of support arms is removably attached to a pair of attachment slots. A first support arm in a pair of support arms is attached in a parallel configuration a predetermined distance apart from a second support arm in the pair of support arms. The pair of support arms is configured to support at least one item display tray. A lifting mechanism holds each pair of support arms in a stacked configuration vertically along the back member in a closed configuration while the dolly is in a transport mode. Each pair of support arms is positioned a minimum distance apart in this transport mode. A display mode control triggers the lifting mechanism to move each pair of support arms from the closed configuration to an open configuration. The lifting mechanism moves a first set of support arms from a first position to a second position, changing a separation distance between the sets of support arms from the minimum distance apart to a maximum distance apart. The display mode enables users to access one or more items on trays supported by the support arms. The maximum distance apart provides sufficient space between trays to permit a user to remove items from the trays.

Other examples provide an item display dolly. A base member of the item display dolly includes a set of wheels and a braking mechanism coupled to the set of wheels. A back member is connected to at least a portion of the base member. The back member includes attachment slots adapted to removably attach at least one support arm. Each support arm is removably attached to an attachment slot. The support arms are configured to support item display trays in a vertical stacked configuration. Each support arm supports at least a portion of an item display tray in a horizontal orientation. A lifting mechanism moves the support arms vertically along the back member from a closed configuration to an open configuration in accordance with a predetermined separation distance associated with each tray level in a plurality of tray levels. The support arms are moved to the closed configuration when the braking mechanism is activated. The lifting mechanism moves a first set of support arms from the closed configuration to the open configuration, changing a separation distance between the sets of support arms. This increased distance between support arms enables a user to remove one or more items from at least one tray. The lifting mechanism moves the support arms vertically along the back member from the open configuration to the closed configuration to prevent movement of the item display trays when the braking mechanism is released.

Still other examples provide a computer-implemented method for managing self-propelled item display devices. A communications interface component obtains sensor data from a set of sensor devices associated with support arms via a network. The sensor data includes weight data associated with each item display tray supported on the support arms. A controller component disengages a propulsion mechanism if the weight data indicates an amount of weight on the support arms exceeds an acceptable weight threshold range. If the weight data indicates the amount of weight on the plurality of support arms is within the acceptable weight threshold range, a navigation component moves the self-propelled display device from a temperature-controlled storage location to an assigned display location via the propulsion mechanism. The lifting mechanism adjusts each pair of support arms vertically along the back member from a closed configuration to an open configuration if the self-propelled display device is present within the assigned display location. The open configuration includes a first set of support arms separated from a second set of support arms by a first separation distance. The second set of support arms is separated from a third set of support arms by a second separation distance. The second separation distance is a greater distance than the first separation distance. The open configuration enables removal of item(s) from trays supported on the support arms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable a configurable item display dolly. In some examples, the item display dolly transports items from a supplier/DC to a store in a transport mode in which support arms are compressed tightly together preventing items from shifting or dislodging from the dolly during transport. When the dolly is placed in an assigned item display location at a store or other retail location, the dolly switches to a display mode. In the display mode, the dolly's support arms move apart, increasing the space between trays to enable users to reach in between the trays and remove items for viewing or purchase. This enables more efficient transport of items and restocking of item display area while minimizing time-expended and improving display stocking efficiency.

Aspects of the disclosure further enable a self-navigation system on the dolly which permits the item display dolly to autonomously move from a storage area to an assigned display area for items on the dolly without user intervention. This permits display area restocking with improved ease and efficiency for users while minimizing labor required to transport items from storage areas to the sales floor.

Figure 1:
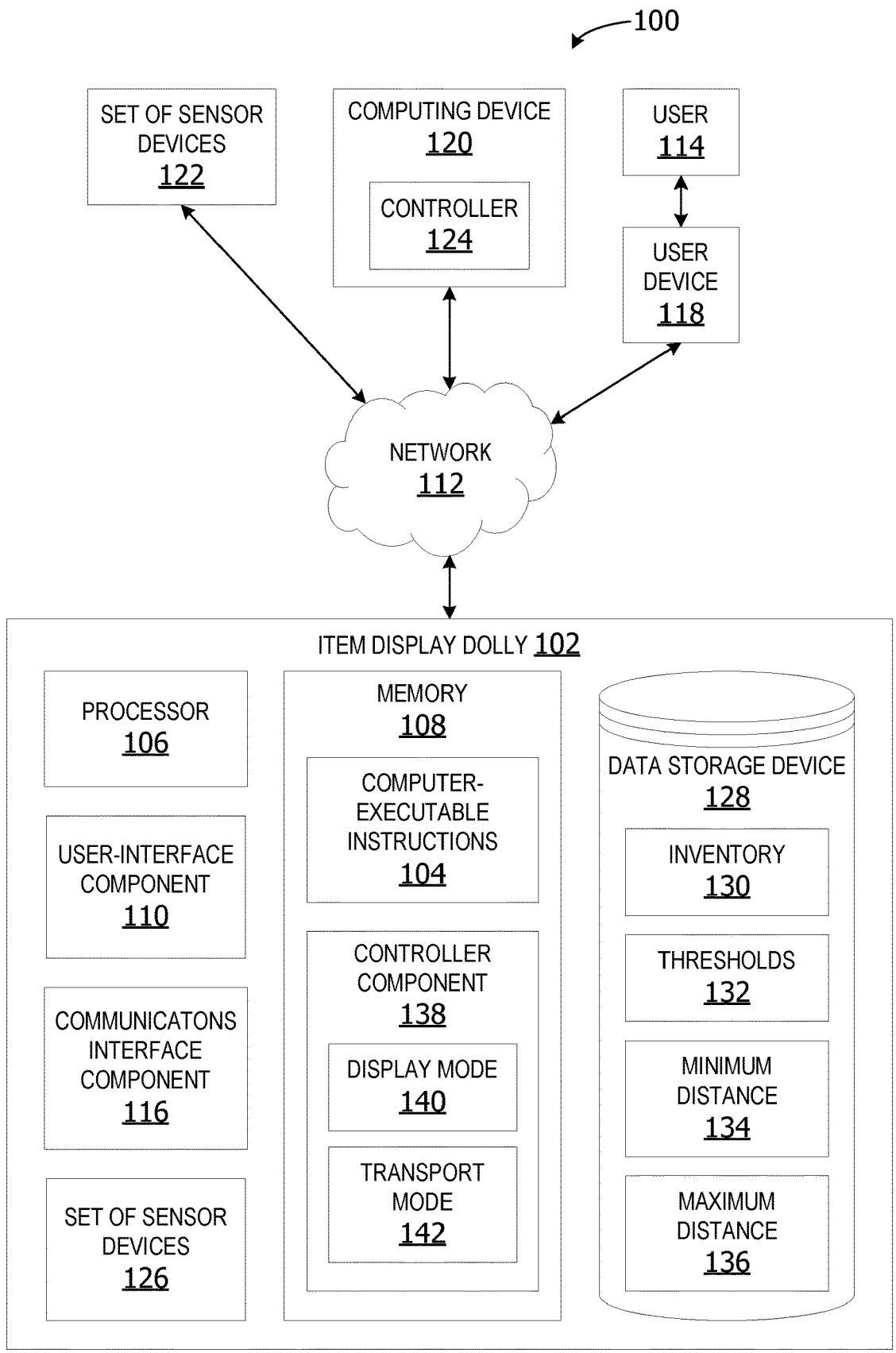
FIG. 1 is an exemplary block diagram illustrating a system for an item display dolly.

Referring again to FIG. 1, an exemplary block diagram illustrates a system 100 for an item display dolly. In the example of FIG. 1, the item display dolly 102 represents a portable item display device for transporting and displaying items or trays of items. The item display dolly 102 can include an integrated computing device for executing computer-executable instructions 104 (e.g., as application programs, operating system functionality, or both) to implement the operations and functionality associated with the item display dolly 102.

In some examples, the item display dolly 102 has at least one processor 106 and a memory 108. The item display dolly 102 can also include a user interface component 110.

The processor 106 includes any quantity of processing units programmed to execute the computer-executable instructions 104. The computer-executable instructions 104 can be performed by the processor 106 or by multiple processors within the item display dolly 102 or performed by a processor external to the item display dolly 102. In some examples, the processor 106 is programmed to execute instructions such as those illustrated in the figures (e.g., FIG. 15 and FIG. 16).

The item display dolly 102 further has one or more computer-readable media such as the memory 108. The memory 108 includes any quantity of media. The memory 108 can be internal to the item display dolly 102 (as shown in FIG. 1), external to the item display dolly (not shown), or both (not shown).

The memory 108 stores data, such as one or more applications. The applications, when executed by the processor 106, operate to perform functionality on the item display dolly 102. The applications can communicate with counterpart applications or services such as web services accessible via a network 112. For example, the applications can represent downloaded client-side applications that correspond to server-side services executing in a cloud.

In other examples, the user interface component 110 includes a graphics card for displaying data to the user and receiving data from the user 114. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 116. The communications interface component 116 includes a network interface card and/or computer-executable instructions (e.g., a driver) for operating the network interface card. Communication between the item display dolly 102 and other devices, such as but not limited to a user device 118, a remote computing device 120, and/or a set of one or more sensor devices 122, can occur using any protocol or mechanism over any wired or wireless connection. In some examples, the communications interface component 116 is operable with short range communication technologies such as by using near-field communication (NFC) tags.

The user device 118 represents any device executing computer-executable instructions. The user device 118 can be implemented as a mobile computing device, such as, but not limited to, a wearable computing device, a mobile telephone, laptop, tablet, computing pad, netbook, gaming device, and/or any other portable device. The user device 118 includes at least one processor and a memory. The user device 118 can also include a user interface component.

The remote computing device 120 represents any device executing computer-executable instructions (e.g., as application programs, operating system functionality, or both) to implement the operations and functionality associated with the computing device 120. The computing device 120 can include a mobile computing device or any other portable device. In some examples, the mobile computing device includes a mobile telephone, laptop, tablet, computing pad, netbook, gaming device, and/or portable media player. The computing device 120 can also include less-portable devices such as servers, desktop personal computers, kiosks, or tabletop devices. Additionally, the computing device 120 can represent a group of processing units or other computing devices.

In some examples, the computing device 120 has at least one processor and a memory. The computing device can be implemented, for example, as a server associated with a data center or a cloud server.

The computing device 120 can include a controller 124 for analyzing sensor data and item data and/or sending instructions to the item display dolly 102. The instructions sent by the controller 124 can include navigation data, configuration change instructions, alert generation instructions, etc. A configuration change instruction is an instruction to change configuration from an open configuration to a closed configuration or a change from the closed configuration to the open configuration.

The set of sensor devices 122 includes one or more sensor devices associated with a distribution center, a warehouse, a retail store, a storage area, a refrigerated display case, or any other environment associated with the item display dolly 102. The item display dolly 102 can optionally receive sensor data from the set of sensor devices 122 via the network 112.

The set of sensor devices 122 can include, without limitation, a weight sensor, a pressure sensor, a thermometer, an image capture device (camera), an infrared (IR) sensor, a radio frequency identifier (RFID) tag reader, an infrared sensor device, or any other type of sensor device.

The item display dolly 102 can also include a set of one or more sensor devices 126 integrated within the item display dolly 102. The set of sensor devices 126 can include, without limitation, a temperature sensor (thermometer), pressure sensor, motion sensor, humidity sensor, IR sensor, RFID tag reader, image capture device, and/or global positioning system (GPS) device.

The system 100 can optionally include a data storage device 128 for storing data, such as, but not limited to inventory 130 data, threshold(s) 132, a minimum (MIN) distance 134 of separation between layers of support arms on the item display dolly and/or a maximum (MAX) distance 136 of separation between layers of support arms on the item display dolly.

The data storage device 128 can include one or more different types of data storage devices, such as, for example, one or more rotating disks drives, one or more solid state drives (SSDs), and/or any other type of data storage device. The data storage device 128 in some non-limiting examples includes a redundant array of independent disks (RAID) array. In other examples, the data storage device 128 includes a database.

The data storage device 128 in this example is included within the item display dolly 102 or associated with the item display dolly 102. In other examples, the data storage device 128 is a remote data storage accessed by the computing device via the network 112, such as a remote data storage device, a data storage in a remote data center, or a cloud storage.

The memory 108 in some examples stores one or more computer-executable components. Exemplary components include a controller component 138. The controller component 138, when executed by the processor 106, triggers a lifting mechanism to move each pair of tray support arms on the item display dolly 102 vertically along a back member of the dolly from a closed configuration to an open configuration when a display mode 140 is selected. The controller component 138 triggers the lifting mechanism to move a first set of tray support arms from a first position to a second position to change a separation distance between the sets of support arms from the minimum distance 134 apart to the maximum distance 136. The maximum distance apart provides sufficient space between layers (trays) for one or more items to be removed from the item display dolly 102.

The controller component 138 triggers the lifting mechanism to move each pair of tray support arms from the open configuration to the closed configuration when a transport mode 142 is selected. In the transport mode 142, the support arms are retracted from the maximum distance 136 back to the minimum distance 134 apart. In the transport mode, the items are held tightly together such that a user is unable to remove items from between the layers of trays on the dolly.

Figure 2:
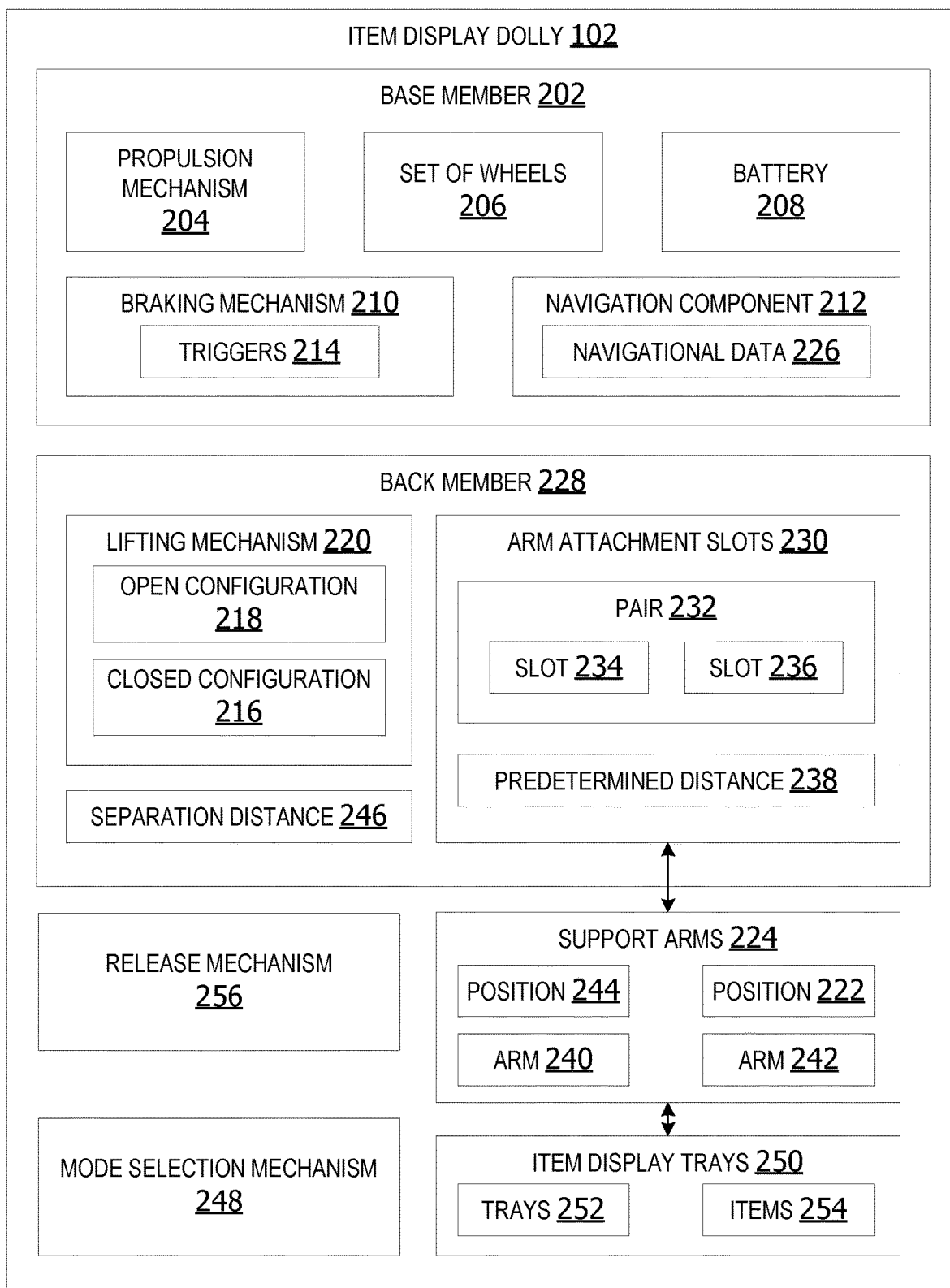
FIG. 2 is an exemplary block diagram illustrating a self-propelled item display dolly.

FIG. 2 is an exemplary block diagram illustrating a self-propelled item display dolly 102. A base member 202 of the dolly 102 includes a propulsion mechanism 204, a set of wheels 206 coupled to the propulsion mechanism 204, at least one battery 208 associated with the propulsion mechanism 204, a braking mechanism 210 and a navigation component 212. The propulsion mechanism 204 provides a means of moving the dolly 102. The propulsion mechanism 204 in some examples is implemented as a motor. In one example, the propulsion mechanism 204 includes an electric motor.

The set of wheels 206 includes a set of one or more wheels. A wheel can include a caster, a roller, or any other type of wheel device. In one example, the set of wheels 206 is a set of four casters. In other examples, the set of wheels 206 include six wheels, eight wheels or any other number of wheels.

The braking mechanism 210 is a mechanism for stopping at least one wheel in the set of wheels 206 from turning. The braking mechanism 210 in one example includes a parking break. When the parking break is activated, the breaking mechanism triggers 214 the lifting mechanism 220 to change a position 222 and/or orientation of one or more support arm(s) 224 from the closed configuration 216 to the open configuration 218.

The navigation component 212 is a system that analyzes real-time sensor data, including image data generated by at least one camera, to create navigational data 226. The navigational data 226 includes instructions to guide the item display dolly 102 from a first location to a second location.

A back member 228 is connected to a portion of the base member 202. The back member 228 includes arm attachment slots 230 arranged in vertical pairs. Each pair 232 of attachment slots includes a first slot 234 located a predetermined distance 238 from a second slot 236.

Support arms 224 are removably attached to the back member 228 via the attachment slots 230. Each arm is removably attached to a slot in the arm attachment slots 230. A first arm 240 is attached in a parallel configuration a predetermined distance 238 apart from a second arm 242. Each pair of arms are separated by the predetermined distance 238 for the closed configuration 216. When the mode selection mechanism 248 is activated, the lifting mechanism increases the separation distance between the pair of support arms is increased in accordance with the open configuration 218.

The open configuration 218 increases the distance between the item display trays 250 such that a user can access/take one or more items 254 from one or more trays 252 on the item display dolly 102.

The lifting mechanism 220 holds each pair of support arms in a stacked configuration vertically along the back member 228 in either the closed configuration 216 associated with a transport mode or the open configuration 218 associated with the display mode.

In some examples, when the display mode is selected, the lifting mechanism 220 moves a first set of tray support arms from a first position 244 to a second position 222 to change a separation distance 246 between the first set of tray support arms and a second set of tray support arms from the minimum distance apart to a maximum distance apart, enabling access to a set of items on at least one tray associated with at least one pair of tray support arms.

A release mechanism 256 in some non-limiting examples enables one or more support arms to be removed/detached from the item display dolly 102. In one example, the release mechanism 256 is a mechanism on the support arm which is activated to release the arm from the dolly. In another example, the release mechanism 256 is a mechanism on the back member of the dolly which is activated to release one or more of the support arms from the item display dolly 102.

Figure 3:
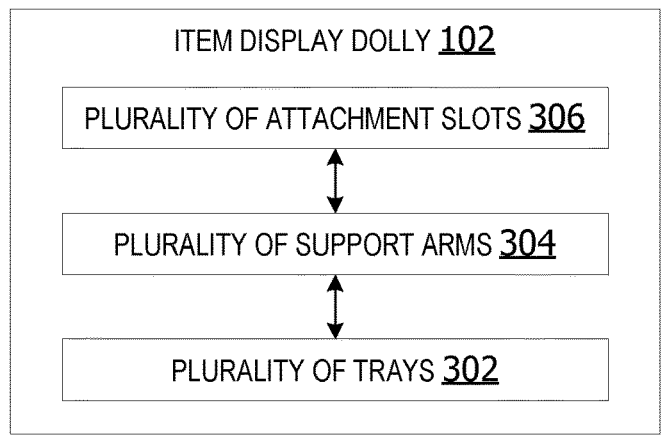
FIG. 3 is an exemplary block diagram illustrating an item display dolly including a plurality of trays.

FIG. 3 is an exemplary block diagram illustrating an item display dolly 102 including a plurality of trays 302, such as, but not limited to, the item display trays 250 in FIG. 2. In some examples, each item display tray in the plurality of trays 302 is supported by at least one support arm in a plurality of support arms 304, such as, but not limited to, the support arms 224 in FIG. 2.

Each support arm attaches to the item display dolly 102 via a slot in a plurality of attachment slots 306, such as, but not limited to, the attachment slots 230 in FIG. 2. An attachment slot in the plurality of attachment slots is a mechanism, recess, cavity, groove or other attachment point at which an attachment end on a support arm can latch onto the item display dolly 102. In some examples, the support arm includes a release mechanism which is activated to release/detach the support arm from the item display dolly 102.

Figure 4:
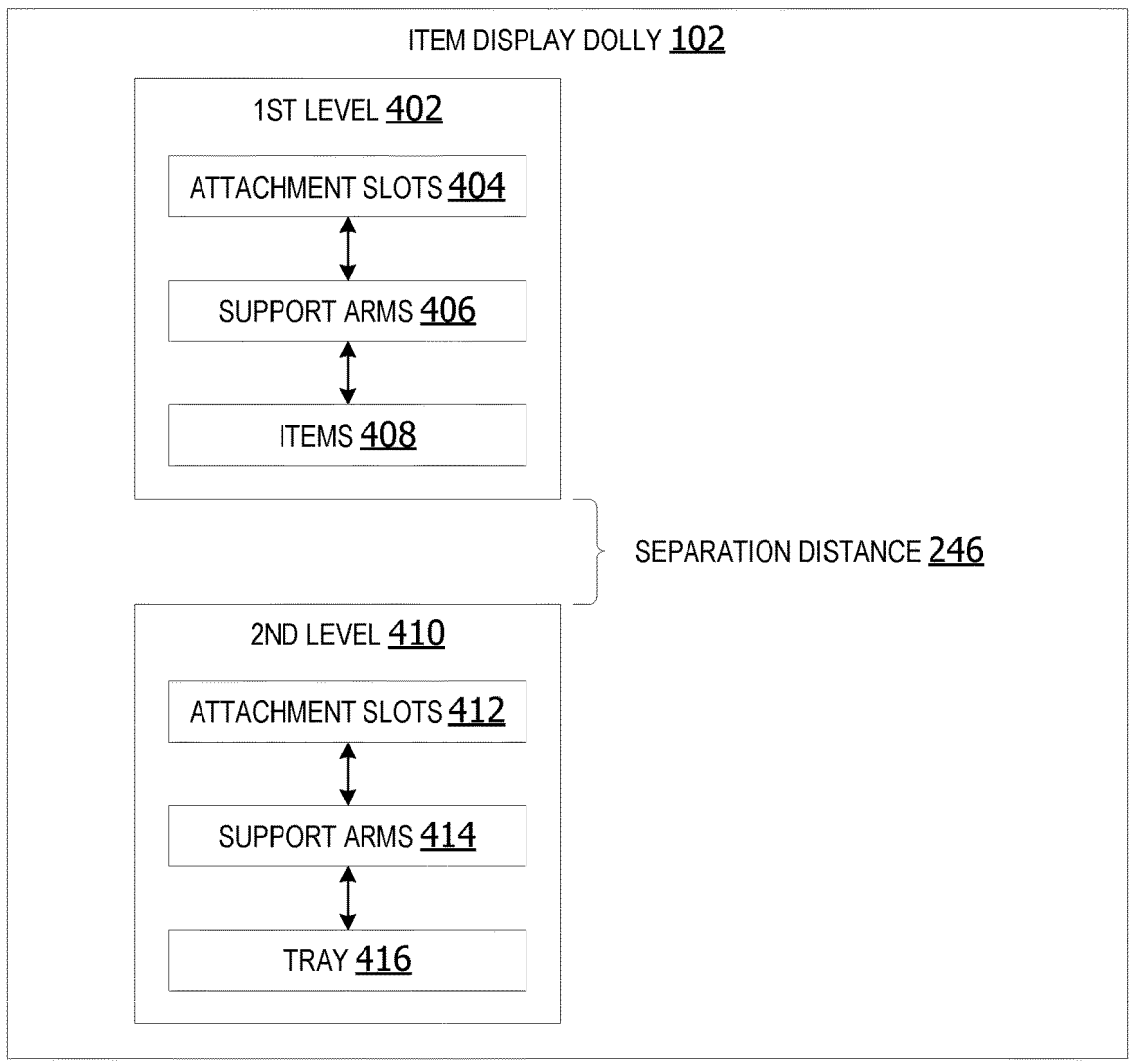
FIG. 4 is an exemplary block diagram illustrating an item display dolly including a plurality of levels.

FIG. 4 is an exemplary block diagram illustrating an item display dolly 102 including a plurality of levels. In some examples, the item display dolly 102 includes two or more levels. In this example, a first level 402 includes one or more attachment slots 404 supporting one or more support arms. The one or more support arms 406 supports one or more items 408 on a tray. The one or more attachment slots 404 can include a single attachment slot, a pair of two attachment slots, as well as three or more attachment slots. The support arms 406 in this example includes a single support arm, a pair of two support arms, as well as three or more support arms. In this example, the attachment slots 404 is a pair of two attachment slots supporting a pair of support arms 406.

The second level 410 in this example includes one or more attachment slots 412 and one or more support arms 414 attached to the attachment slots 412. The one or more support arms 414 support a tray 416. The tray can be an empty tray, as well as a tray holding one or more items.

Each level is separated by a separation distance 246. In a closed configuration, the separation distance 246 is the minimum distance. In the open configuration, the separation distance 246 is the maximum distance.

Figure 5:
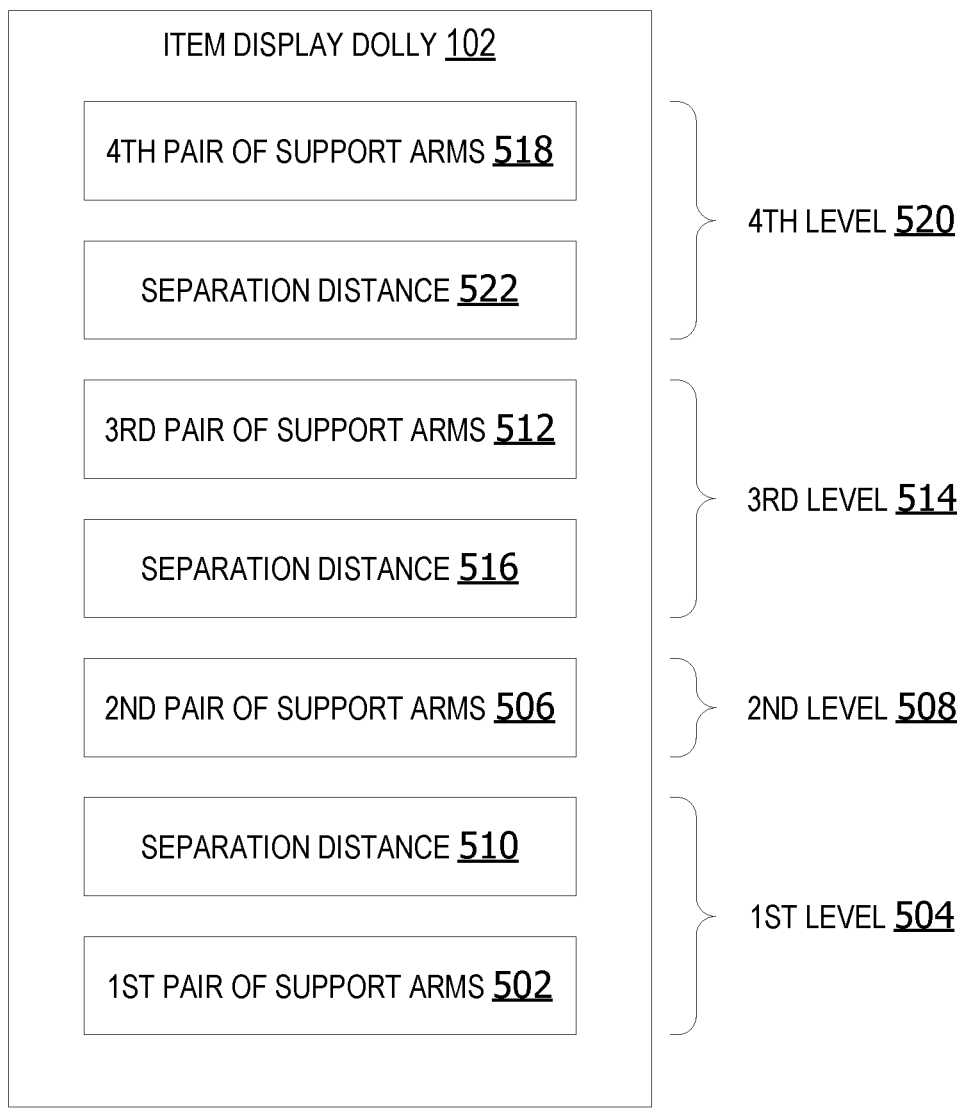
FIG. 5 is an exemplary block diagram illustrating an item display dolly including a plurality of support arms separated by differing separation distances.

FIG. 5 is an exemplary block diagram illustrating an item display dolly 102 including a plurality of pairs of support arms separated by differing separation distances, such as, but not limited to, the separation distance 246 in FIG. 2. A first pair of tray support arms 502 at a first level 504 and a second pair of tray support arms 506 at a second level are positioned a first separation distance 510 apart by the lifting mechanism. A third pair of tray support arms 512 at a third level 514 and the second pair of tray support arms 506 are located a second separation distance 516 apart by the lifting mechanism. The second separation distance 516 is greater than the first separation distance 510.

The third pair of tray support arms 512 and a fourth pair of tray support arms 518 at a fourth level 520 are located at a third separation distance 522 apart. The third separation distance 522 is a greater distance than the second separation distance 516.

Figure 6:
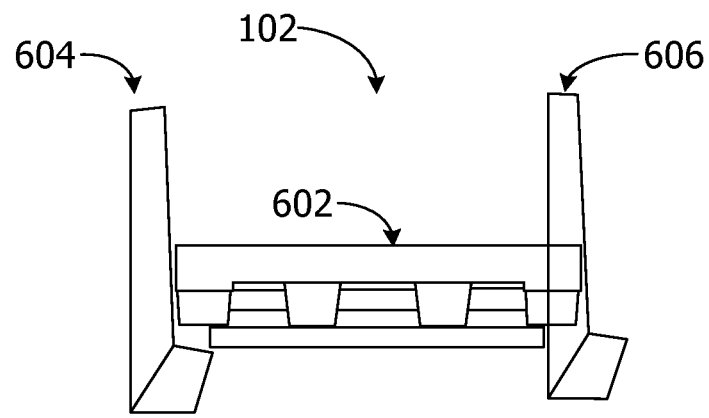
FIG. 6 is an exemplary block diagram illustrating an item display dolly attachment for a tray.

FIG. 6 is an exemplary block diagram illustrating an item display dolly 102 attachment for a tray 602. The tray 602 is supported by a pair of support arms 604 and 606.

Figure 7:
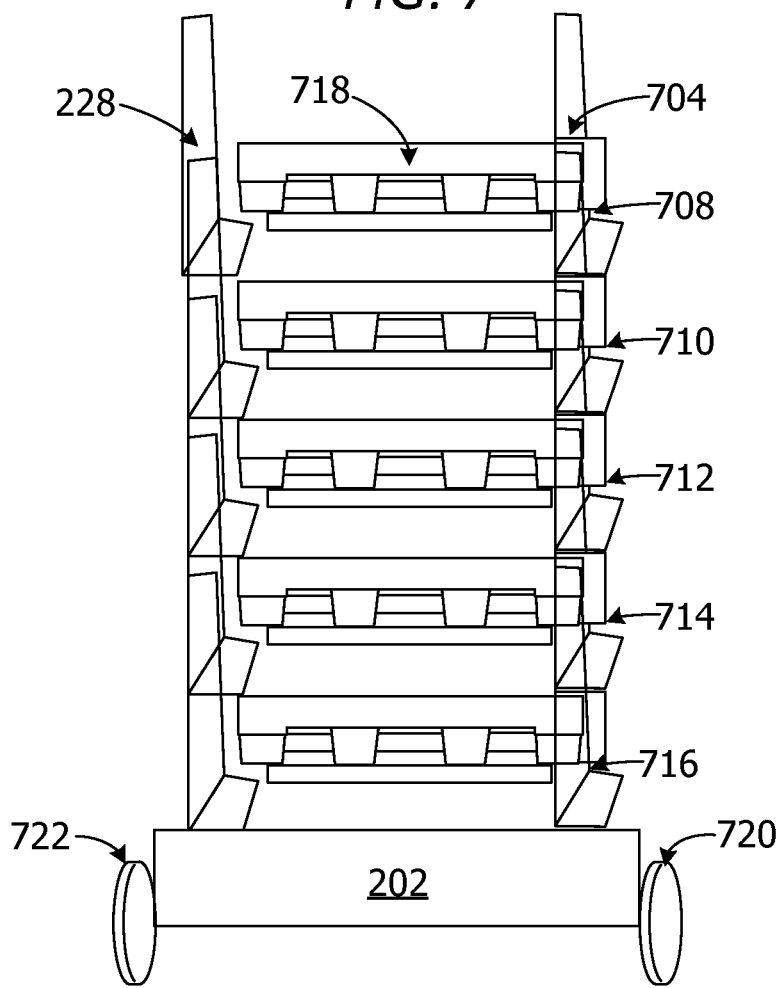
FIG. 7 is an exemplary front view of an item display dolly.

FIG. 7 is an exemplary front view of an item display dolly 102. The item display dolly 102 includes a plurality of support arms at a plurality of levels. A base member 202 includes a back member 228. The back member 228 includes a first portion of the back member 228 and a second portion of the back member 228. The back member supports the plurality of support arms at various levels. The levels include a first level 708, a second level 710, a third level 712, a fourth level 714 and a fifth level 716. Each level in this non-limiting example includes a tray supported by two support arms. For example, the first level 708 in this example is a highest level including a tray 718. The item display dolly 102 in this example includes a set of two wheels 722 and 724.

Figure 8:
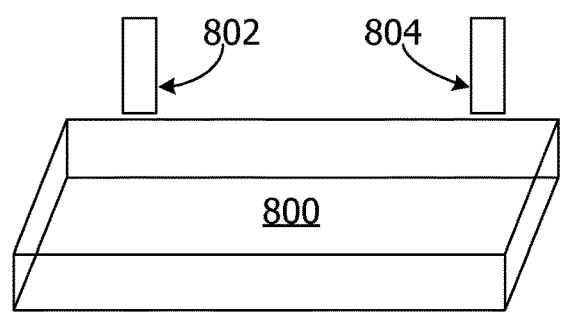
FIG. 8 is an exemplary front view of a tray for storing tools on an item display dolly.

FIG. 8 is an exemplary front view of a tray 800 for storing tools on an item display dolly. The tray is supported by a pair of support arms attached to the item display dolly via the attachment slots 802 and 804.

Figure 9:
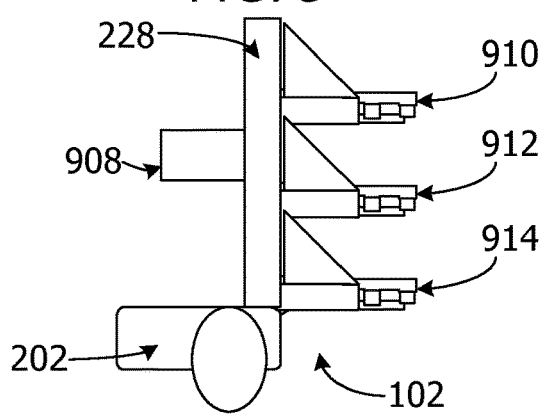
FIG. 9 is an exemplary side view of an item display dolly.

FIG. 9 is an exemplary side view of an item display dolly 102. The item display dolly 102 includes a base member 202, at least one wheel 904, a back member 228 and a handle 908. The handle 908 can optionally include a user interface and/or one or more controls for driving the item display dolly, a mode selection control for selecting a display mode (open configuration) or a transport mode (closed configuration).

The base member 202 in this example is a standing platform on which a user can stand. The base member 202 can include a counter weight to counter-balance the load on the support arms. In one example, the counter weight is a minimum of one-thousand five-hundred pounds. The dimensions of the base member in this non-limiting example is twenty-four inches wide by sixteen inches long by four inches high.

The item display dolly in this non-limiting example includes three levels. Each level includes a tray supported on at least one support arm. In levels include a tray 910 at a top level, a tray 912 at a middle layer, and a tray 914 at a lowest (bottom) layer.

Figure 10:
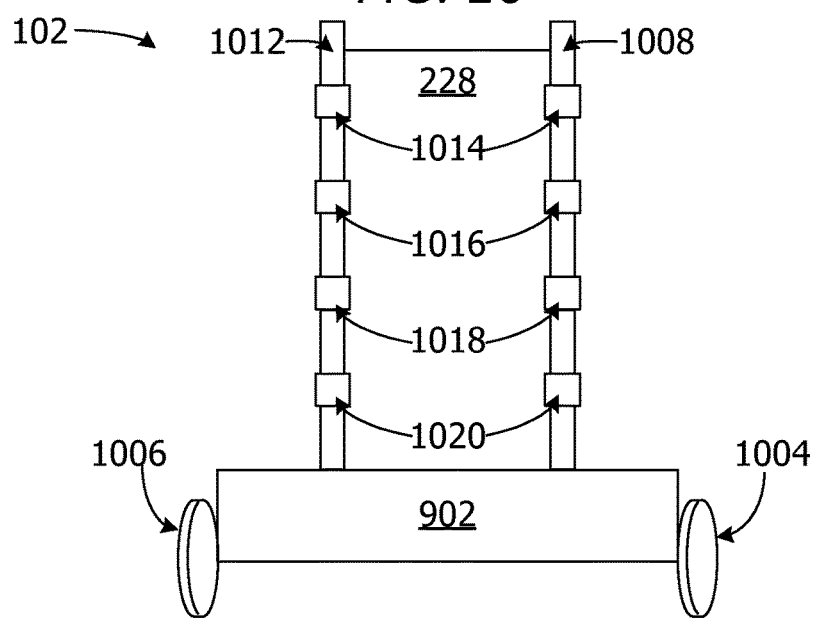
FIG. 10 is an exemplary front view of the item display dolly without support arms.

FIG. 10 is an exemplary front view of the item display dolly 102 without support arms. The item display dolly 102 includes a base member 202 and a set of wheels. The set of wheels in this non-limiting example includes a wheel 1004 and a wheel 1006. A back member 228 includes a first back support 1008 and a second back support 1012. The back member 228 includes a plurality of attachment slots for support arms (not shown). The plurality of attachment slots includes a first pair of slots 1014 at a first level, a second pair of slots 1016 at a second level, a third pair of slots 1016 at a third level, a fourth pair of slots 1018 at a fourth level, and a fifth pair of slots 10120 at the lowest (fifth) level of the item display dolly.

Figure 11:
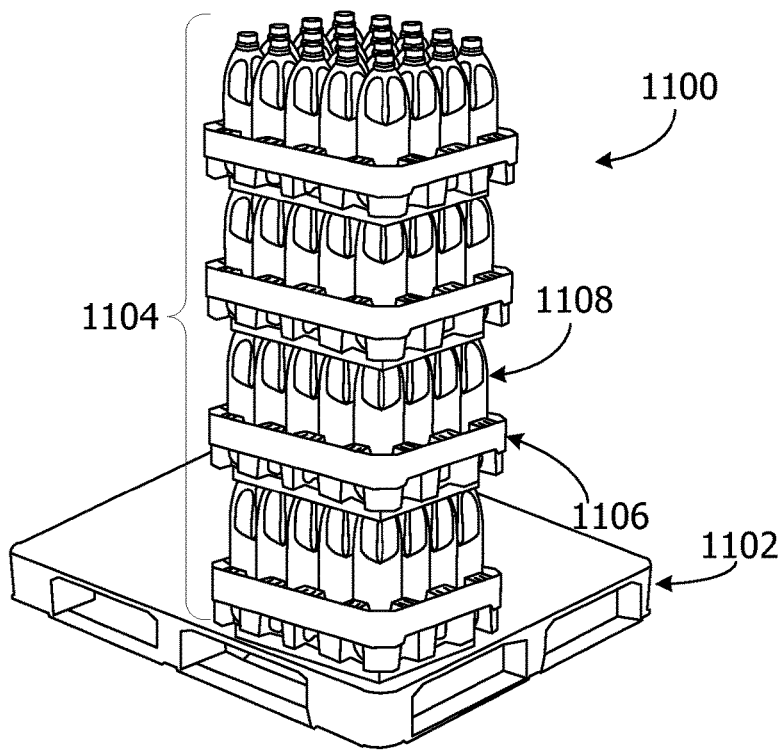
FIG. 11 is an exemplary block diagram illustrating a plurality of trays of items on a pallet.

FIG. 11 is an exemplary block diagram illustrating a plurality of trays of items on a pallet 1100. The pallet 1100 includes a pallet base 1102 supporting a plurality of trays of items 1104, such as, but not limited to, the tray 1106 of milk jugs 1108.

Figure 12:
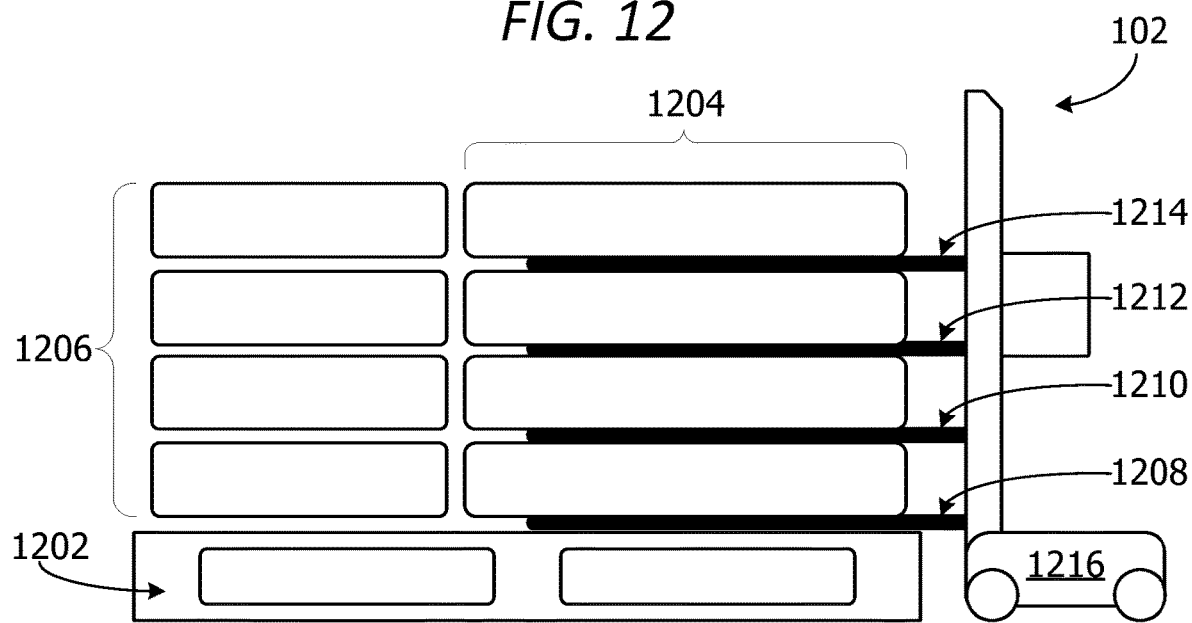
FIG. 12 is an exemplary block diagram illustrating an item display dolly picking up a set of trays of items off the pallet for transport to an item display area.

FIG. 12 is an exemplary block diagram illustrating an item display dolly 102 picking up a set of trays 1204 of items off the pallet 1202 for transport to an item display area. The set of trays 1204 from the plurality of trays of items 1206 are lifted off the pallet by the set of support arms. The set of support arms in this example includes support arms 1208, 1210, 1212 and 1214 on the item display dolly 102.

Figure 13:
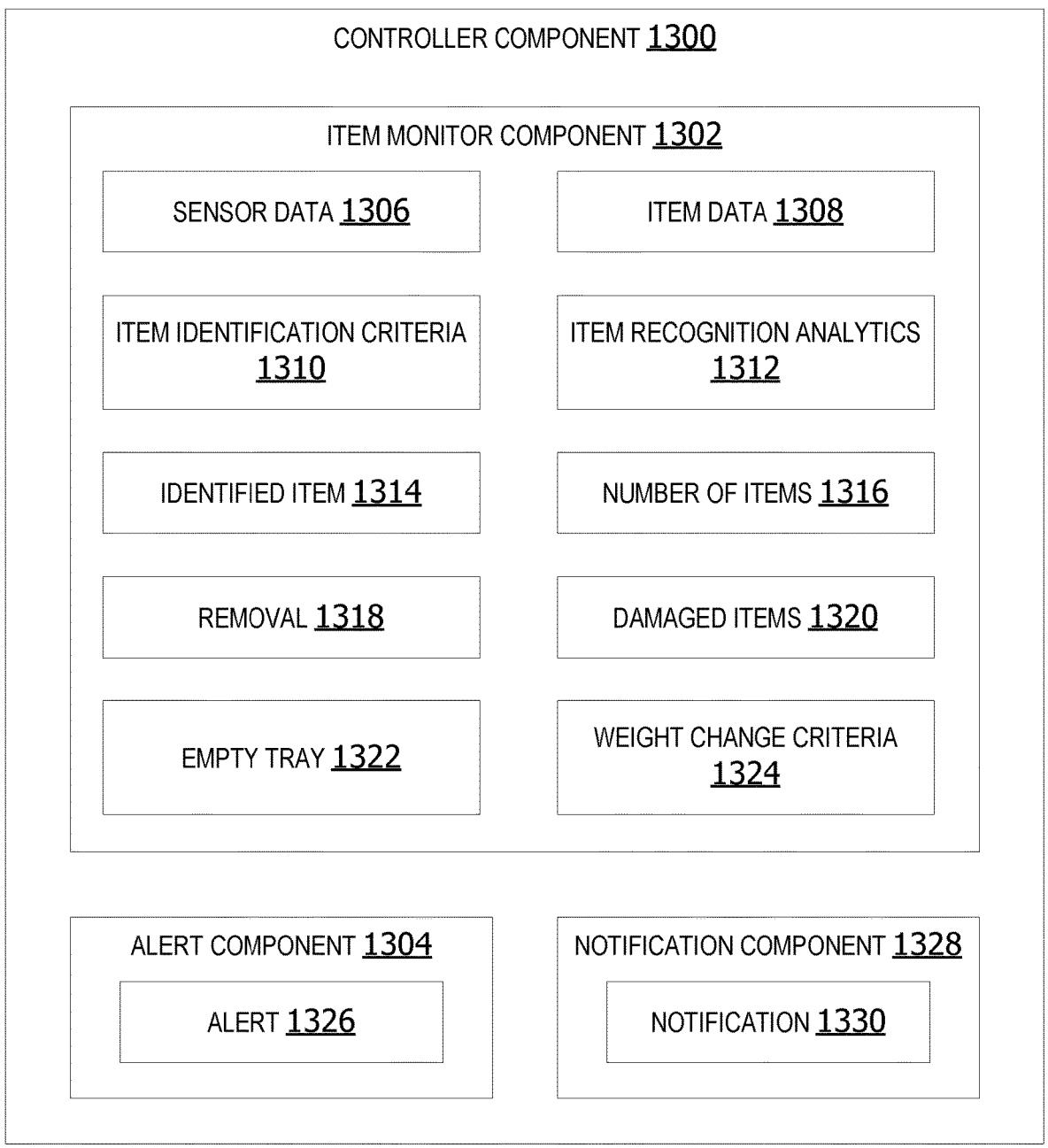
FIG. 13 is an exemplary block diagram illustrating a controller component.

FIG. 13 is an exemplary block diagram illustrating a controller component 138. The controller component 138 can include an item monitor component 1302 and an alert component 1304. The item monitor component 1302 in some examples analyzes sensor data 1306, including weight data, image data, temperature data, and/or pressure sensor data, associated with at least one tray support arm on the self-propelled item display dolly. The sensor data 1306 is obtained from the set of pressure sensor devices, such as, but not limited to, the set of sensor devices 122 or 126 in FIG. 1. The item monitor component 1302 analyzes the sensor data 1306 and item data 1308 associated with items on the item display dolly to identify one or more items on the item display dolly.

The item monitor component 1302 in some examples analyzes the sensor data 1306, including image data, and the item data 1308 using a set of item identification criteria 1310 and item recognition analytics 1312 to identify one or more items 1314 on the dolly, identify a number of items 1316 on the dolly, recognize removal 1318 of an identified item 1314, identify a damaged item 1320 and/or identify an empty tray 1322.

The item monitor component 1302 in other examples analyzes the sensor data 1306, including weight data, with the item data 1308 using a set of item weight change criteria 1324 to identify a rate of weight change associated with an item indicating a damaged item 1320, removal of an item or an empty tray on the dolly.

The alert component 1304 in other examples generates an alert 1326 on condition at least one item display tray associated with at least one pair of tray support arms is empty or an item is damaged or leaking based on the analysis of the sensor data. In other examples, the alert component 1304 outputs the alert 1326 if analysis of the sensor data indicates an amount of weight on the item display dolly exceeds a maximum weight threshold. In still other examples, the alert component 1304 sends an alert to the user if an analysis of the sensor data indicates a temperature of items on the dolly falls outside an acceptable temperature threshold range for cold-chain compliance of at least one item on the item display dolly.

The alert 1326 can be output to the user as a visual alert via a user interface on the item display dolly, such as a light emitting diode (LED) display screen. The alert 1326 can also be output to the user as an audible alert, such as a beeping sound. The alert 1326 in still other examples includes a flashing light, a display of text, an audible warning (verbal communication), etc.

In other non-limiting examples, a notification component 1328 sends a notification 1330 to a user device associated with the user. The notification can include a warning or notification alert. For example, the notification can include an identifier associated with the item display dolly and a description of the problem detected. The problem detected can include a damaged/leaking item, an empty tray, a temperature that is higher than the maximum cold-chain compliant recommended temperature, etc.

Figure 14:
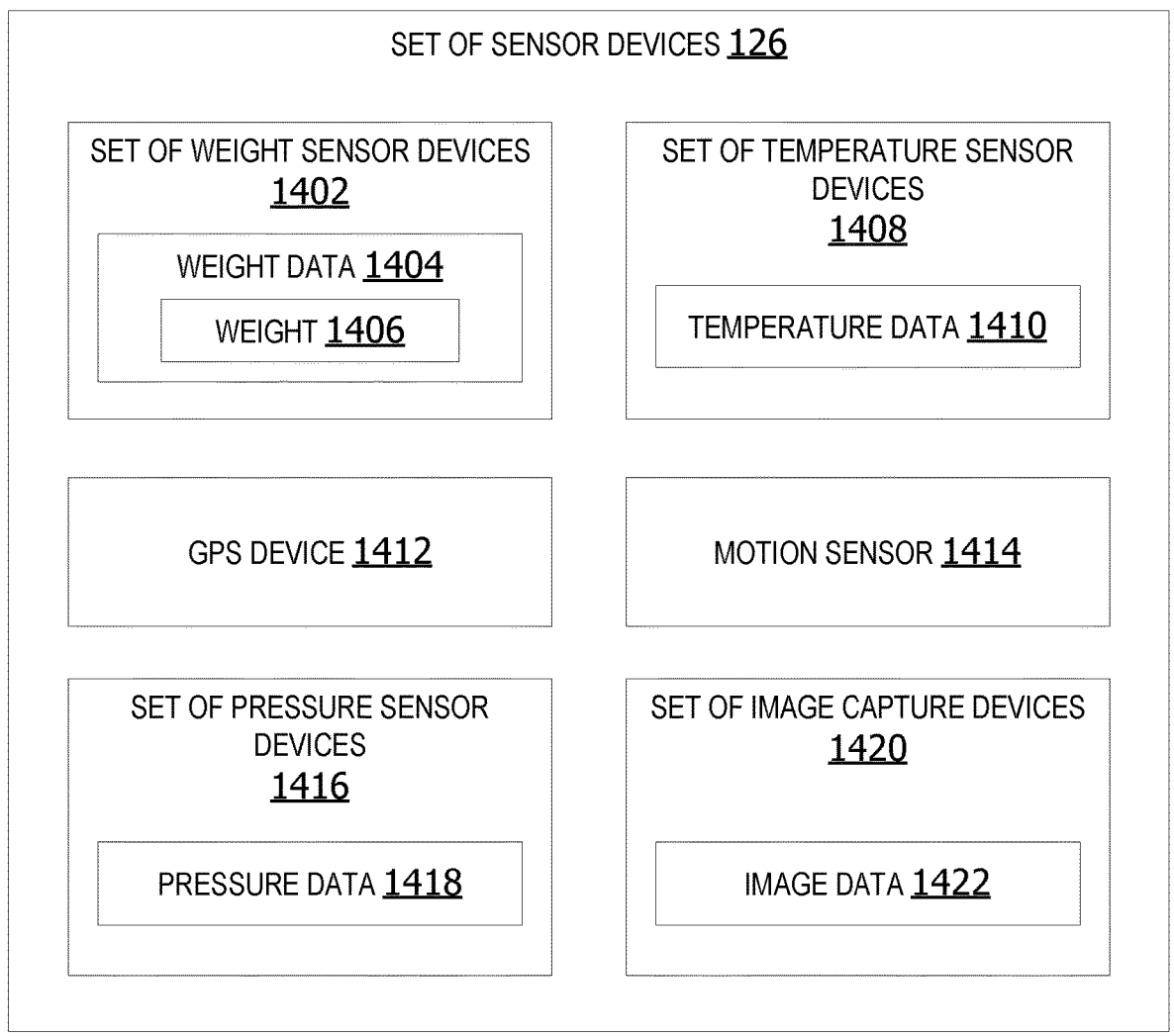
FIG. 14 is an exemplary block diagram illustrating a set of sensor devices.

FIG. 14 is an exemplary block diagram illustrating a set of sensor devices 126. The set of sensor devices 126 on the item display dolly can include a set of weight sensors 1402 generating weight data 1404 associated with a weight of one or more items on one or more support arms. The propulsion mechanism disengages if the weight 1404 associated with the plurality of pairs of tray support arms exceeds a maximum threshold weight in one non-limiting example.

A set of one or more temperature sensors 1408 generates temperature data 1410 associated with items on the dolly and/or an ambient temperature around the dolly. A GPS device 1412 can optionally generate location data utilized by the navigation component (navigation system) for self-navigation/self-propulsion. A motion sensor 1414 can optionally generate motion data associated with motion of the item display dolly and/or motion of users removing items from the dolly.

A set of one or more pressure sensor devices 1416 in some examples generates pressure data 1418 associated with trays and/or items supported on one or more support arms. The pressure data 1418 can be analyzed to identify items being removed from the dolly.

In some examples, a set of one or more image capture devices 1420 generates image data 1422. The image data 1422 can be analyzes by the navigation system for self-propulsion/self-navigation. The image data 1422 can also be analyzed to identify items on the dolly, calculate the number (quantity) of items on the dolly for inventory purposes, identify damaged items on the dolly, identify items which have remained stationary (not moved or rotated) for a predetermined time-period, and/or identify empty trays on the dolly.

Figure 15:
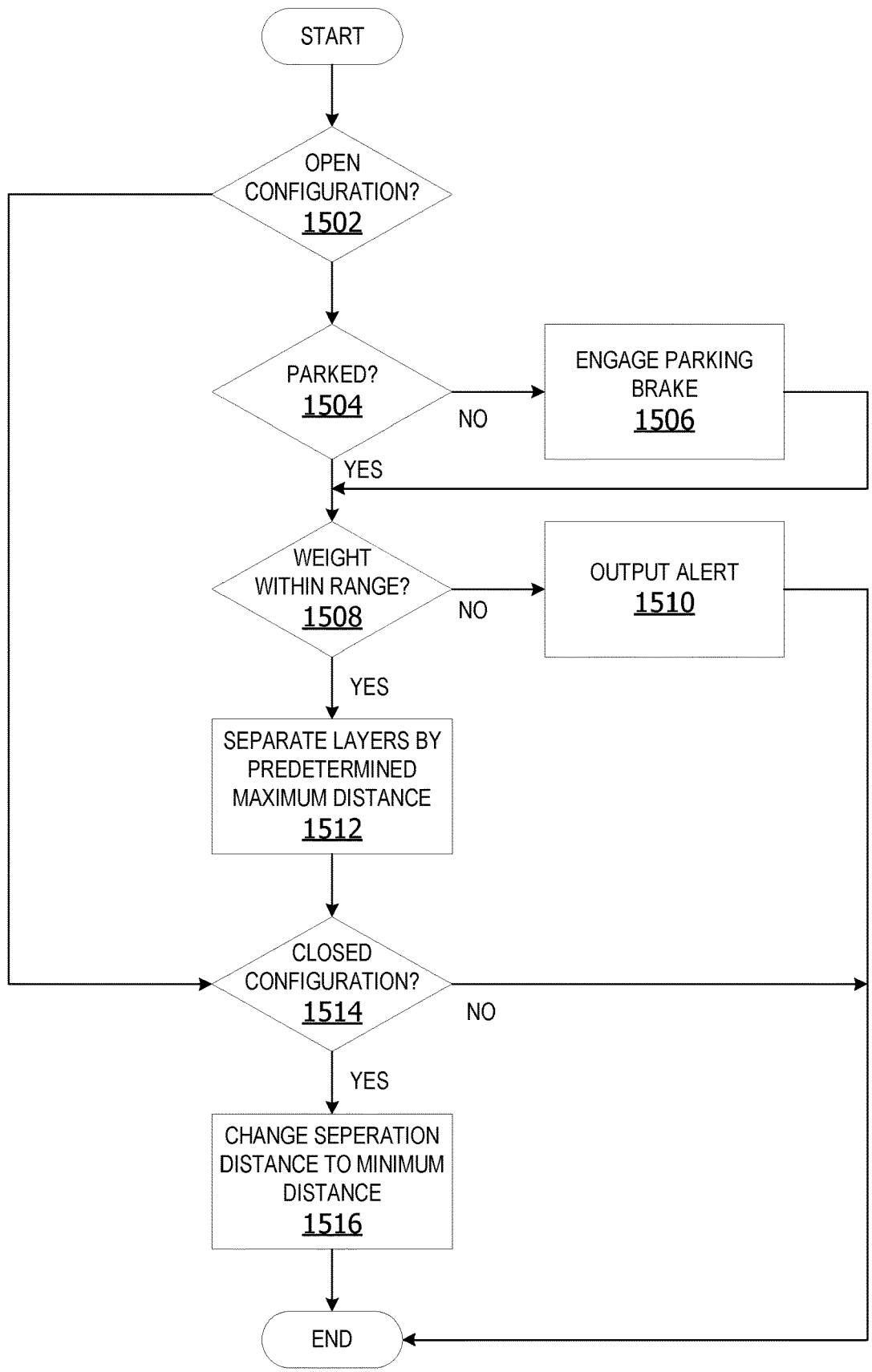
FIG. 15 is an exemplary flow chart illustrating operation of the computing device to change a configuration of support arms on an item display dolly.

FIG. 15 is an exemplary flow chart illustrating operation of the computing device to change a configuration of support arms on an item display dolly. The process shown in FIG. 15 can be performed by a controller component, executing on a computing device, such as a computing device on an item display dolly 102, the user device 118 or the remote computing device 120 in FIG. 1.

The process begins by determining whether a user selects an open configuration at 1502. If yes, the controller component determines if the item display dolly is parked at 1504. If no, the parking brake is automatically engaged at 1506. The controller component determines if an amount of weight on the item display dolly is within an acceptable weight range at 1508. If no, the controller component outputs an alert to the user at 1510. The process terminates thereafter.

If the weight on the dolly is within the acceptable threshold range, the controller component separates the layers of items on the dolly by a predetermined maximum distance at 1512. The controller component determines if a closed configuration is selected by the user at 1514. If no, the process terminates thereafter.

If a closed configuration is selected at 1514, the controller component changes the separation distance between the layers of items/trays from the maximum distance to the minimum distance at 1516. The process terminates thereafter.

While the operations illustrated in FIG. 15 are performed by a computing device, aspects of the disclosure contemplate performance of the operations by other entities. For example, a cloud service can perform one or more of the operations.

Figure 16:
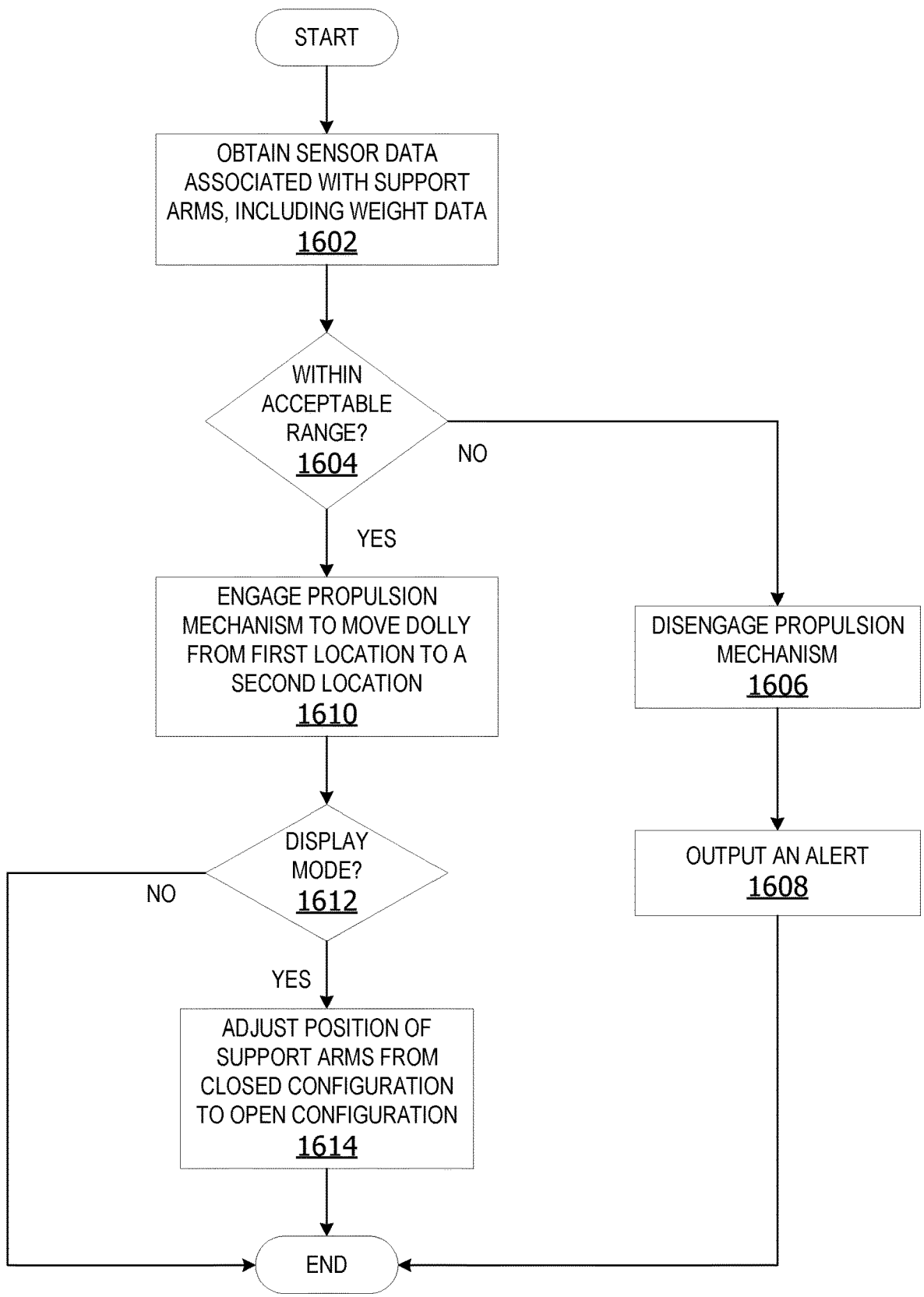
FIG. 16 is an exemplary flow chart illustrating operation of the computing device to utilize weight data to control configuration changes in an item display dolly.

FIG. 16 is an exemplary flow chart illustrating operation of the computing device to utilize weight data to control configuration changes in an item display dolly. The process shown in FIG. 16 can be performed by a controller component, executing on a computing device, such as a computing device on an item display dolly 102, the user device 118 or the remote computing device 120 in FIG. 1.

The process begins by obtaining sensor data associated with support arms, including weight data at 1602. The controller component determines if the weight on the dolly is within an acceptable range at 1604. If no, the controller component disengages a propulsion mechanism at 1606. The controller component outputs an alert at 1608. The process terminates thereafter.

Returning to 1604, if the weight is within the acceptable range, the controller component engages the propulsion mechanism to move the dolly from a first location to a second location at 1610. For example, the dolly can move itself from a storage area to the sales floor.

The controller component determines if a display mode is selected at 1612. If no, the process terminates thereafter. If the display mode is selected, the controller component adjusts the position of support arms from a closed configuration to the open configuration at 1614. The process terminates thereafter.

While the operations illustrated in FIG. 16 are performed by a computing device, aspects of the disclosure contemplate performance of the operations by other entities. For example, a cloud service can perform one or more of the operations.

ADDITIONAL EXAMPLES

A dolly is provided in some examples which is an item transport dolly and a display fixture for retail stores. The dolly picks up multiple layers of trays via arms that slide into mating slots in the stacked trays. The arms carry each tray's weight and lift it slightly using a lifting mechanism. The dolly monitors cold chain compliance by analysing temperature data generated by digital integrated thermometers. The dolly includes safety devices that provide alarms for weight limits on a given support arm. The level separation between the trays is powered with an electric motor and a chain or cable dedicated to each level. The tray levels can be controlled individually or together.

In some examples, the dolly is a self-propelled item display dolly having configurable/removable support arms. In a display mode, the item display dolly's support arms separate for easy user access to items on trays supported by the support arms. In a transportation mode, the support arms contract into a closed configuration to prevent movement of the trays/items on the trays.

The display mode in some examples triggers separating/opening all layers of trays on the dolly. In other examples, the display mode includes a hybrid partially open configuration in which a user can select to separate out (open) one or more selected layers of trays while leaving the remaining tray layers compressed together in the closed configuration. For example, a user can pick/select the top three highest layers of trays to be placed in the open configuration while leaving the lower layers in the closed/compressed configuration.

The item display dolly autonomously remains in closed configuration (transport mode) if the weight of items and/or trays supported by the support arms exceeds a maximum threshold. The item display dolly can also provide alarms, such as visual and auditory alerts, if the temperature of items in the cart falls outside an acceptable threshold range for cold-chain compliance.

The dolly in some examples includes piezoelectric sensors in the wheels (casters). The piezoelectric sensors detect stress/weight/load on the dolly. If the load is too great, the dolly remains in the closed configuration and/or generates an alarm/alert to at least one user indicating the weight of items on the dolly is too great. The dolly can also include gyroscopic leveling to prevent tipping/unbalancing of trays/items on the dolly.

In other non-limiting examples, the dolly has support arms that slide into mating slots in the stacked trays. The support arms are removable for cleaning or reconfiguring support arms to accommodate different sizes of trays and different types of items. The arms carry each tray's weight, and lift it slightly, such that the trays are no longer resting on top of one another. This enables the display mode.

The support arms in some examples are removable, such that each arm can be detached from the dolly. In other examples, the arms fold downward into a groove or slot when not in use. In still other examples, the support arms retract into a groove or slot in the dolly's back member.

In other examples, the support arms are provided in various sizes, shapes and length to accommodate different sized, shapes and types of trays for transporting/displaying different types of items. For example, the support arms for holding milk trays can be changed to different sized arms configured to carry spare parts, batteries, auto parts, appliances, electronics or any other types of items. The arms can also be utilized to carry large parts and machinery, such as, but not limited to, blow mold machines that make plastic jugs, cleaning equipment, repair parts, condensers, etc. In other examples, the dolly can be used to carry and display automotive batteries of significant weight. The dolly can also be used to transport home improvement supplies, lawn and garden tools, beverages, or any other type of items. For example, the dolly can be utilized to move paint, drywall mud, push mowers, pallets of soda, pallets of water, or mixed pallets.

The dolly can be utilized to transport and arrange kitted components for a non-moving assembly line. In these examples, the dolly stores all the parts required to assemble an item, such as in an assembly kit. For example, a kit can include the parts to assemble a chair, a desk, a doll house, or any other type of item requiring assembly. The dolly holds the various parts/pieces of the kit on arms at various levels (different heights) for convenient access to the parts by the user. This enables the parts to be packed tightly into a smaller space on the dolly for transport to an assembly area. When the user is ready, the user presses a pedal or otherwise engages a switch to change the dolly from the closed configuration to the open configuration. The levels separate to make the parts easily accessible to the user during the assembly process. The kit items can be placed on the dolly such that the next-needed part is always on top.

The dolly can be used for maintenance and/or repair parts. In a maintenance or repair scenario, the parts/equipment/supplies needed for maintenance or repair can be placed on the dolly in the order in which those items are expected to be needed during the repair.

The dolly can be utilized to hold spare parts weighing hundreds of pounds. Different size arms are utilized to carry different types of items. In one example, a single support arm holds between one-hundred and one-hundred twenty-five pounds each. A single large, heavy item can be carried on one heavy duty arm. In other examples, the dolly can be designed to move and/or display up to five-hundred pounds. In still other examples, the dolly transports and/or displays loads up to six-hundred pounds. In still other examples, the dolly transports and displays loads exceeding six-hundred pounds when properly counter-balanced and/or anchored to a secure fixture.

In some examples, the support slots have variable/adjustable range of attachment heights. The adjustable range of slots are utilized for different arm configurations. Different support arms can be attached at different attachment slots/points to accommodate different loads and different pallet heights. The support arms are configurable for different pallet heights and different types/sizes of items. Any number of customized arms can be attached to the dolly based on the number and size of items to be carried and displayed on the dolly.

The lifting mechanism can be hydraulic, in some examples. In other examples, the lifting mechanism is implemented as a cable-winch or a ball screw mechanical linear actuator. The lifting mechanism can include an electric motor and a chain or cable dedicated to each level/pair of support arms. The height/position of each arm can be controlled or adjusted individually or together.

In one example, the lifting mechanism includes multiple sized sprockets on a common shaft. When the shaft turns, each sprocket drives a different length of chain assigned to a different level of the dolly. This allows for the proper level separation of distance "y", which requires the bottom level to raise 0y, second level to move y, third level to move 2y, and fourth level to move 3y.

The lifting mechanism moves the support arms together for transport or move the arms apart for display. In one example, if the trays are to be separated by one inch (1"), the first and second arms are separated by one inch, the second and third layers are separated by two inches, the third and fourth layers are separated by three inches, etc.

The dolly can be composed on primarily of aluminum and/or stainless steel. In other examples, the dolly includes one or more parts composed of aluminum, steel, plastic, and/or any other suitable material. In one non-limiting example, the dolly includes a counter-weight within the base member of the dolly to counter-balance the weight of fully loaded trays of items on the dolly when the dolly is fully loaded.

The dolly in other examples includes self-propulsion or assisted-propulsion, such as an autonomous robotic dolly. The dolly can also be a remotely controlled device controlled by a user with a remote control or an autonomous robotic dolly in other examples. The dolly includes a motor (electric motor), power source (battery) and a lifting mechanism to move trays up and down along the dolly's back support member. The arms can be evenly spaced using sprockets to separate the various individual layers. The dolly can also include a braking mechanism, parking break (feet), bump stops, collision avoidance systems, navigation systems, etc.

In an example scenario, when a user engages the parking brake, the dolly automatically switches to an open configuration. The levels separate by being mechanically linked to the brake or by a logical connection in the controller.

The dolly in other examples includes a processor, memory, and controller component for managing stored/displayed on the dolly. The dolly can communicate with sensors in a refrigerated display case and/or remote computing devices to share data regarding recommended temperature range for items on the dolly for cold chain compliance, current temperature of items on the dolly, ambient temperature, amount of time items have been on the dolly, expiration date, removal of items off the dolly, rotation of items from the back of the trays to the front of the trays after a given period of time or after items in the front of the trays have been selected, etc. The dolly controller can output alerts/alarms or instructions to a user via a user interface or a notification to a user device regarding removal of expired items, rotation of items, empty trays, maintenance issues, temperatures exceeding the recommended range, etc.

The dolly can be implemented as a robotic sensor device for transporting items. The sensor device(s) on the dolly can include sensors generating data associated with the dolly, items/trays on the dolly, and the environment around the dolly. In some example, the sensor devices on the dolly include temperature sensors (integrated digital thermometers), weight sensors, motion sensors, pressure sensors, GPS, lidar to map three-hundred sixty degrees, piezoelectric sensors, infrared sensors, cameras (image capture devices), humidity sensors, etc. The dolly can analyze the sensor data via the controller on the dolly or send the sensor data to a remote computing device for analysis, such as a cloud server or a backend server, via a network. The sensors can be located on the base member, the back member, within the wheels, within the attachment slots, and/or on the support arms.

In other examples, the controller monitors items on the dolly to detect damaged or leaking items. The controller can utilize the weight sensors and wireless communications technology to report an inventory of items on the dolly to a remote computing device and/or update an inventory record on a remote data storage. As weight on a support arm decrements, the perpetual inventory (PI) decrements by the corresponding multiple of the item weight. The PI can also be referred to as system inventory. Non-multiple amounts indicate a problem, which would be communicated to the staff.

In these examples, the controller knows the weight of each item on the dolly. If weight sensors associated with the support arms detect the weight of a tray decrementing slowly/gradually over time without removal of items or decrementing weight in increments that are less than the weight of a single item, the controller uses that data to identify a leaking jug/bottle or otherwise damaged item. The controller can also utilize transaction (sales) data to determine that the weight of items on the tray is decrementing without sales of any items. This can also indicate a problem (leak) associated with one or more items.

For example, if a gallon of milk on a given level weigh eight pounds per gallon, but weight is decrementing by a few ounces at each sensor interrogation, this is likely a leak due to a broken jug.

The dolly in other examples provides configurable support arms for stacking milk crates/trays to transport and display milk jugs/cartons. A pallet for moving milk is typically heavy, difficult to lift, and not very maneuverable. If the milk crates/pallet weighs more than fifty pounds, it requires two or more users to lift/move it. The dolly provides a maneuverable device for moving multiple crates/trays of milk from a DC to a store and from a store's back room (storage area) to a refrigerated display case on the sales floor without any user lifting, breaking open pallets, removing individual milk jugs/cartons, or stocking display shelves.

In an example scenario, the dolly works in concert with milk jugs and mating trays which allow for sufficient load bearing in the bottom layer for stacking. The bottom contour of the tray rests uniformly across the top contour of the jugs below. In the display mode, the dolly and the various levels of milk containing trays are wheeled directly to a dairy case door. This makes it possible for customers to shop the lower level trays without having to unstack/remove the upper layers of trays. With the layers separated, the customers can shop from the lower levels, middle layers, and the top levels.

The dolly is also useful in the case of a mixed pallet of lower volume dairy products such as chocolate milk, almond milk, one-percent milk, skim milk, or other items which are typically stocked in low numbers. Also, in the event an item on the dolly breaks during transit, the entire stack does not need to be unloaded to remove the broken jug. Instead, the dolly can be switched to display mode, separating the trays so the broken item can be easily removed. The dolly can then be switched back to the closed configuration for transport or storage until needed on the sales floor.

In another example, the dolly serves as both a pallet/pallet-fork for transporting items from a DC to a store's sales floor/dairy case. The dolly coverts from transport mode to display mode, including sufficiently spaced display shelves within a dairy case. In this example, one-by-one unpacking of each item from a shipping pallet for shelf stocking in the traditional dairy case is unnecessary because the dolly itself serves as both a transport for the items as well as a display on the sales floor for the items.

The dolly can be utilized to move pallets, assist with building/loading pallets, assist with unloading pallets, and/or provide shelving units in a retail unit/refrigerated display for displaying milk or other items on pallet trays. In this manner, the dolly enables a single user to quickly and easily move an entire pallet of items and/or unload multiple trays of items in a display area without assistance.

In another scenario, the dolly can be used to build mixed pallets more efficiently. Traditionally, if a mixed pallet requires a given a product to be in a given location on the mixed pallet, the pallet can be required to take a non-optimal path in a warehouse/DC to build the pallet in the correct order. For example, the pallet can go to the westmost end for the first layer, then the easternmost end for the second layer, then back to the westernmost end for the third layer. This is very inefficient. Using the dolly in an open configuration, items are placed on the first and third layer first and then items can be placed on the middle/inner layer last. This enables a mixed pallet to be assembled in a single trip through the DC/warehouse without doubling back.

Alternatively, or in addition to the other examples described herein, examples include any combination of the following:

a set of weight sensor devices obtaining weight data associated with the plurality of pairs of support arms, the propulsion mechanism disengages on condition a weight associated with the plurality of pairs of support arms exceeds a maximum threshold weight;

a set of pressure sensor devices associated with the self-propelled item display dolly;

an item monitor component, implemented on at least one processor, that analyzes pressure sensor data associated with at least one support arm on the self-propelled item display dolly obtained from the set of pressure sensor devices to identify removal of at least one item from the self-propelled item display dolly;

a data storage device storing item data associated with the set of items on the self-propelled item display dolly;

a plurality of sensor devices generating sensor data associated with the plurality of support arms;

an item monitor component, implemented on the at least one processor, analyzes the sensor data and the item data associated with a set of items assigned to the self-propelled item display dolly using a set of item identification criteria;

the item monitor component, implemented on the at least one processor, identifies an item removed from at least one tray on the plurality of support arms based on the analysis of the sensor data;

an item monitor component, implemented on the at least one processor, that analyzes the sensor data, tray data and item data associated with a set of items assigned to the self-propelled item display dolly using a set of item identification criteria to identify the number of items remaining on each tray on the plurality of support arms;

an alert component, implemented on the at least one processor, that generates an alert on condition at least one item display tray associated with at least one pair of support arms is empty based on the analysis of the sensor data;

an item monitor component, implemented on the at least one processor, that analyzes the sensor data, tray data and item data associated with a set of items assigned to the self-propelled item display dolly using a set of item weight change criteria to identify a rate of weight change associated with an item indicating a damaged item;

an alert component, implemented on the at least one processor, that generates an alert on condition at least one item associated with at least one pair of support arms is damaged based on the analysis of the sensor data;

a braking mechanism associated with a set of wheels configured to trigger separation of each pair of support arms by a predetermined separation distance;

a first pair of support arms and a second pair of support arms moved a first separation distance apart by the lifting mechanism;

a third pair of support arms and the second pair of support arms moved a second separation distance apart by the lifting mechanism, wherein the second separation distance is greater than the first separation distance;

the third pair of support arms and a fourth pair of support arms moved a third separation distance apart by the lifting mechanism, wherein the third separation distance is a greater distance than the second separation distance;

a first pair of support arms and a second pair of support arms moved a first separation distance apart by the lifting mechanism;

a third pair of support arms and the second pair of support arms moved a second separation distance apart by the lifting mechanism, wherein the second separation distance is greater than the first separation distance;

the third pair of support arms and a fourth pair of support arms moved a third separation distance apart by the lifting mechanism, wherein the third separation distance is a greater distance than the second separation distance;

a propulsion mechanism coupled to the set of wheels; at least one battery associated with the propulsion mechanism; and a navigation component, wherein the navigation system provides navigational data to the propulsion mechanism to enable the portable item display device (item display dolly) to move from a first location to a second location via self-propulsion;

a support arm release mechanism, wherein activation of the release mechanism enables at least one support arm to be detached from at least one attachment slot;

a set of sensor devices generating sensor data associated with at least one item on at least one tray supported on at least one support arm; and a communications interface component that sends the sensor data to a remote computing device via a network;
an item monitor component, implemented on the at least one processor, that analyzes sensor data obtained from the set of sensor devices and item data associated with a set of items assigned to the item display dolly using a set of criteria to identify removed items and damaged items based on a result of the analysis;
generating, via a user interface device, an alert indicating the maximum weight threshold is reached on condition a transport mode is initiated while the weight data indicates the amount of weight on the plurality of support arms exceeds the maximum weight threshold;
adjusting, by the lifting mechanism, the position of each pair of support arms in the plurality of support arms from the open configuration along the back member to the closed configuration on condition a transport mode selection is received;
the closed configuration comprising placement of each pair of support arms a predetermined minimum distance apart, the closed configuration preventing removal of a set of items from at least one tray supported on at least one pair of support arms in the plurality of support arms;
analyzing sensor data generated by the set of sensor devices associated with the plurality of support arms, including temperature data, to determine a temperature associated with a set of items stored on the smart item display dolly device; and generating an alert on condition the temperature falls outside an acceptable temperature range;
analyzing sensor data generated by the set of sensor devices associated with the plurality of support arms, including weight data, to determine a rate of weight change associated with at least one item in a set of items stored on the smart item display dolly device; and generating an alert on condition the rate of weight change indicates a damaged or leaking item in the set of items.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14.

In some examples, the operations illustrated in FIG. 15 and FIG. 16 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for controlling an item display dolly. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, such as when encoded to perform the operations illustrated in FIG. 15 and FIG. 16, constitute exemplary means for obtaining sensor data from a set of sensor devices associated with a plurality of support arms via a network, the sensor data including weight data associated with each item display tray in a plurality of item display trays supported on the plurality of support arms; exemplary means for disengaging a propulsion mechanism on condition the weight data indicates an amount of weight on the plurality of support arms exceeds an acceptable weight threshold rang based on analysis of the sensor data; exemplary means for moving the self-propelled display device from a temperature-controlled storage location to an assigned display location on condition the weight data indicates the amount of weight on the plurality of support arms is within an acceptable weight threshold range; and exemplary means for adjusting each pair of support arms in the plurality of support arms vertically along the back member from the closed configuration to the open configuration associated with a display mode on condition the self-propelled display device is present within the assigned display location, the open configuration comprising a first set (pair) of support arms separated from a second set of support arms by a first separation distance and the second set of support arms separated from a third set of support arms by a second separation distance, the second separation distance is a greater distance than the first separation distance, the open configuration enabling removal of a set of items from at least one tray supported on at least one pair of support arms in the plurality of support arms.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A self-propelled item display dolly, the self-propelled item display dolly comprising:
   a base member, the base member comprising a propulsion mechanism, a set of wheels coupled to the propulsion mechanism, at least one battery associated with the propulsion mechanism, and a navigation component;
   a back member connected to a portion of the base member, the back member comprising a plurality of attachment slots arranged in pairs, each pair of attachment slots comprising a first attachment slot located a predetermined distance from a second attachment slot;
   a plurality of pairs of support arms removably attached to the back member via the plurality of attachment slots, each pair of support arms in the plurality of pairs of support arms removably attached to a pair of attachment slots in the plurality of attachment slots, a first support arm in a first pair of support arms placed in a parallel configuration the predetermined distance apart from a second support arm in the first pair of support arms, the first pair of support arms configured to support at least one item display tray;
   a lifting mechanism configured to hold each pair of support arms in a stacked configuration vertically along the back member in a closed configuration associated with a transport mode, the first pair of support arms is positioned a minimum distance apart from a second pair of support arms on condition the transport mode is selected; and
   a display mode control configured to trigger the lifting mechanism to move each pair of support arms vertically along the back member from the closed configuration to an open configuration on condition the display mode is selected, the lifting mechanism moves the first pair of support arms from a first position to a second position to change a separation distance between the first pair of support arms and the second pair of support arms from the minimum distance apart to a maximum distance apart enabling access to a set of items on the at least one tray associated with the second pair of support arms, the maximum distance apart permitting the set of items associated with the second pair of support arms to be removed from the self-propelled item display dolly.

2. The self-propelled item display dolly of claim 1, further comprising:
   a set of weight sensor devices obtaining weight data associated with the plurality of pairs of support arms, the propulsion mechanism disengages on condition a weight associated with the plurality of pairs of support arms exceeds a maximum threshold weight.

3. The self-propelled item display dolly of claim 1, further comprising:
   a memory;
   at least one processor communicatively coupled to the memory;
   a set of pressure sensor devices associated with the self-propelled item display dolly; and
   an item monitor component, implemented on the at least one processor, that analyzes pressure sensor data associated with at least one support arm on the self-propelled item display dolly obtained from the set of pressure sensor devices to identify removal of at least one item from the self-propelled item display dolly.

4. The self-propelled item display dolly of claim 1, further comprising:
a memory;
at least one processor communicatively coupled to the memory;
a data storage device storing item data associated with the set of items on the self-propelled item display dolly;
a plurality of sensor devices generating sensor data associated with the plurality of support arms;
an item monitor component, implemented on the at least one processor, analyzes the sensor data and the item data associated with a set of items assigned to the self-propelled item display dolly using a set of item identification criteria; and
the item monitor component, implemented on the at least one processor, identifies an item removed from the at least one tray on the plurality of support arms based on the analysis of the sensor data.

5. The self-propelled item display dolly of claim 1, further comprising:
a memory;
at least one processor communicatively coupled to the memory;
a plurality of sensor devices generating sensor data associated with the plurality of support arms;
an item monitor component, implemented on the at least one processor, that analyzes the sensor data, tray data associated with a set of trays on the plurality of support arms and item data associated with a set of items assigned to the self-propelled item display dolly using a set of item identification criteria to identify a number of items remaining on the set of trays; and
an alert component, implemented on the at least one processor, that generates an alert on condition the at least one item display tray associated with at least one pair of support arms is empty based on the analysis of the sensor data.

6. The self-propelled item display dolly of claim 1, further comprising:
a memory;
at least one processor communicatively coupled to the memory;
a plurality of sensor devices generating sensor data associated with the plurality of support arms;
an item monitor component, implemented on the at least one processor, that analyzes the sensor data, the tray data and item data associated with the set of items assigned to the self-propelled item display dolly using a set of item weight change criteria to identify a rate of weight change associated with an item indicating a damaged item;
an alert component, implemented on the at least one processor, that generates an alert on condition at least one item associated with at least one pair of support arms is damaged based on the analysis of the sensor data.

7. The self-propelled item display dolly of claim 1, further comprising:
a braking mechanism associated with the set of wheels configured to trigger separation of each pair of support arms by a predetermined separation distance.

8. The self-propelled item display dolly of claim 1, further comprising:

the first pair of support arms and the second pair of support arms moved a first separation distance apart by the lifting mechanism; and
a third pair of support arms and the second pair of support arms moved a second separation distance apart by the lifting mechanism, wherein the second separation distance is greater than the first separation distance.

9. The self-propelled item display dolly of claim 8, further comprising:
the third pair of support arms and a fourth pair of support arms moved a third separation distance apart by the lifting mechanism, wherein the third separation distance is a greater distance than the second separation distance.

10. A portable item display device, the portable item display device comprising:
a base member comprising a set of wheels and a braking mechanism coupled to the set of wheels;
a back member connected to at least a portion of the base member, the back member comprising a plurality of attachment slots adapted to removably attach at least one support arm;
a plurality of support arms removably attached to the back member, each support arm removably attached to an attachment slot in the plurality of attachment slots, the plurality of support arms configured to support a plurality of item display trays in a vertical stacked configuration, each support arm in the plurality of support arms configured to support at least a portion of an item display tray in a horizontal orientation;
a lifting mechanism associated with the plurality of attachment slots that moves the plurality of support arms vertically along the back member from a closed configuration to an open configuration in accordance with a predetermined separation distance associated with each tray level in a plurality of tray levels on condition the braking mechanism is activated, the lifting mechanism moving a first pair of support arms from the closed configuration to the open configuration changing a separation distance between the first pair of support arms and a second pair of support arms to enable removal of items from at least one tray in the plurality of item display trays; and
the lifting mechanism moves the plurality of support arms vertically along the back member from the open configuration to the closed configuration, prevent movement of the plurality of item display trays on condition the braking mechanism is released.

11. The portable item display device of claim 10, further comprising:
the first pair of support arms and the second pair of support arms moved a first separation distance apart by the lifting mechanism;
a third pair of support arms and the second pair of support arms moved a second separation distance apart by the lifting mechanism, wherein the second separation distance is greater than the first separation distance; and
the third pair of support arms and a fourth pair of support arms moved a third separation distance apart by the lifting mechanism, wherein the third separation distance is a greater distance than the second separation distance.

12. The portable item display device of claim 10, further comprising:
a propulsion mechanism coupled to the set of wheels;
at least one battery associated with the propulsion mechanism, and a navigation component, wherein the navigation component provides navigational data to the propulsion mechanism to enable the portable item display device to move from a first location to a second location via self-propulsion.

13. The portable item display device of claim 10, further comprising:
a release mechanism, wherein activation of the release mechanism enables at least one support arm to be detached from at least one attachment slot.

14. The portable item display device of claim 10, further comprising:
a set of sensor devices generating sensor data associated with at least one item on at least one item display tray supported on at least one support arm; and
a communications interface component that sends the sensor data to a remote computing device via a network.

15. The portable item display device of claim 10, further comprising:
a memory;
at least one processor communicatively coupled to the memory;
a set of sensors associated with the at least one tray display arm; and
an item monitor component, implemented on the at least one processor, that analyzes sensor data obtained from the set of sensor devices and item data associated with a set of items assigned to the portable item display device using a set of criteria to identify removed items and damaged items based on a result of the analysis.

16. A computer-implemented method for managing self-propelled item display devices, the computer-implemented method comprising:
obtaining, via a communications interface component, data from a set of sensor devices associated with a plurality of support arms via a network, the sensor data including weight data associated with each item display tray in a plurality of item display trays supported on the plurality of support arms;
disengaging, by a controller component, a propulsion mechanism on condition the weight data indicates an amount of weight on the plurality of support arms exceeds an acceptable weight threshold range based on analysis of the sensor data;
moving, via a navigation component, an item display dolly from a temperature-controlled storage location to an assigned display location via the propulsion mechanism on condition the weight data indicates the amount of weight on the plurality of support arms is within the acceptable weight threshold range; and
adjusting, by a lifting mechanism, each pair of support arms in the plurality of support arms vertically along a back member from a closed configuration to an open configuration associated with a display mode on condition the item display dolly is present within the assigned display location, the open configuration comprising a first set of support arms separated from a second set of support arms by a first separation distance and the second set of support arms separated from a third set of support arms by a second separation distance, the second separation distance is a greater distance than the first separation distance, the open configuration enabling removal of a set of items from at least one item display tray supported on at least one pair of support arms in the plurality of support arms.

17. The computer-implemented method of claim 16, further comprising:
generating, via a user interface device, an alert indicating a maximum weight threshold is reached on condition a transport mode is initiated while the weight data indicates the amount of weight on the plurality of support arms exceeds the maximum weight threshold.

18. The computer-implemented method of claim 16, further comprising:
adjusting, by the lifting mechanism, the position of each pair of support arms in the plurality of support arms from the open configuration along the back member to the closed configuration on condition a transport mode selection is received the closed configuration comprising placement of each pair of support arms a minimum distance apart, the closed configuration preventing removal of the set of items from the at least one item display tray supported on at least one pair of support arms in the plurality of support arms.

19. The computer-implemented method of claim 16, further comprising:
analyzing the sensor data generated by the set of sensor devices associated with the plurality of support arms, including temperature data, to determine a temperature associated with the set of items stored on the item display dolly; and
generating an alert on condition temperature falls outside an acceptable temperature range.

20. The computer-implemented method of claim 16, further comprising:
analyzing the sensor data generated by the set of sensor devices associated with the plurality of support arms, including weight data, to determine a rate of weight change associated with at least one item in the set of items stored on the item display dolly; and
generating an alert on condition the rate of weight change indicates a damaged or leaking item in the set of items.

* * * * *